United States Patent [19]

Abe et al.

[11] Patent Number: 5,110,687
[45] Date of Patent: May 5, 1992

[54] COMPOSITE MEMBER AND METHOD FOR MAKING THE SAME

[75] Inventors: Mutsumi Abe, Kobe; Takashi Motoda, Hyogo; Keni-ichi Aota, Ichikawa, all of Japan

[73] Assignee: Kabushiki Kaisha Kobe Seiko Sho, Kobe, Japan

[21] Appl. No.: 606,182

[22] Filed: Oct. 31, 1990

[51] Int. Cl.$^5$ .................. B22F 7/06; B32B 31/20
[52] U.S. Cl. ..................... 428/551; 428/626; 156/308.2
[58] Field of Search ........ 156/308.2; 428/545, 428/546, 411.1, 624, 625, 626, 551

[56] References Cited

U.S. PATENT DOCUMENTS

| | | | |
|---|---|---|---|
| 3,875,275 | 4/1975 | Lemelson | 264/46.6 |
| 3,944,704 | 3/1976 | Dirks | 264/46.4 |
| 4,431,979 | 2/1984 | Stijntjes | 335/210 |
| 4,722,824 | 2/1988 | Wiech, Jr. | 419/6 |
| 4,879,055 | 11/1989 | Sezaki et al. | 252/62.54 |
| 4,943,319 | 7/1990 | Yanagawa | 75/229 |
| 4,947,065 | 8/1990 | Ward et al. | 310/44 |

FOREIGN PATENT DOCUMENTS 342296 11/1989 European Pat. Off.
2443912 7/1980 France.

OTHER PUBLICATIONS

Patent Abstracts of Japan, vol. 6, No. 253 (M-178)[1131], Dec. 11, 1982; & JP-A-57 148 615 (Hitachi Seisakusho K.K.) Sep. 9, 1982 *Abstract*.

*Primary Examiner*—Brooks H. Hunt
*Assistant Examiner*—Daniel J. Jenkins
*Attorney, Agent, or Firm*—Oblon, Spivak, McClelland, Maier & Neustadt

[57] ABSTRACT

A composite member which comprises at least two molding members made of different compositions each comprising a metallic powder and/or a ceramic powder and a resin material is described. The at least two molding members are fully integrated through bonding of the resin materials in the respective members. A method for fabricating the composite member is also described, in which at least one molding member is bonded with another member which is filled in molding dies in the form of a powdery mixture and heated to a temperature sufficient to melt resin materials in the respective members to integrally bond the member through bonding of the resin materials.

8 Claims, 3 Drawing Sheets

COMPOSITE MEMBER AND METHOD FOR MAKING THE SAME

BACKGROUND OF THE INVENTION

1. Field of the Invention

This invention relates to composite members of the type wherein two or more molded members are strongly integrated and more particularly, to polyfunctional composite members wherein when applied as electronic, electric or mechanical parts, they are kept stably integrated over a long term especially at bonded portions of the two or more members. The invention also relates to method for making the composite members of the type mentioned above. Only for convenience's sake, the composite members to which the invention is directed are described herein as applied as a rotor in spindle motors for hard disk drives.

2. Description of the Prior Art

A rotor in spindle motors for hard disk drives has been constituted of a composite member which is made of an iron member of a circular form integrated with an aluminum member of an inverted pot shape. The iron member shows the function as a magnetic circuit and the aluminum member takes part in a corrosion resistance and precise cuttability.

FIG. 5 shows an illustrative view, in section, of the most popular method of fabricating the rotor. In the figure, a separately provided iron pipe member 2 is placed in a cavity 3 of molds 1a, 1b as shown, and an aluminum melt is introduced into the cavity 3 through a melt passage 1c to integrally mold with the pipe 2. Subsequently, the molding product is precisely finished by machining and cutting.

Aside from the above fabrication method, there is known an integrating method wherein an iron member and an aluminum member are separately formed and subjected to shrinkage fit, expansion fit or mechanical caulking fits such as serration and knurling. The members may be not only cast and mechanical processed products, but also powder-sintered products.

However, the iron member and the aluminum member integrally formed by the casting are combined together only by restriction and mechanical caulking fit caused by shrinkage through solidification of the aluminum melt. In this condition, when an external force is applied to by machining during a fabrication process or when a heat cycle having a great temperature difference in a working environment is repeatedly suffered such as in the case of the rotor, there is indicated the problem that both members are liable to be loosened owing to the difference in thermal expansion therebetween.

In the casting procedure of aluminum, cavities may be formed in the aluminum member, or impurities or inclusions may be involved in the member. For utilization as the rotor of a spindle motor which is required to have a high precision that an error in revolution should be not larger than 0.25 $\mu$m, there has been a problem with respect to the precision.

As stated before, the use of the powder-sintered product instead of the cast product has been considered. In this connection, however, for the formation of integrally sintered molding products through HIP treatment of different kinds of metal powders, a pluraity of powdery materials have to be properly formulated at desired positions. This is not technically completed from the standpoint of production techniques. In addition, this method has a great problem on cost.

We developed composite materials such as disclosed, for example, in U.S Pat. No. 4,943,319, wherein ferromagnetic powders such as of Fe and metallic powders such as Al are admixed and pressed for diffusion bonding to obtain composite materials. These composite materials have been provided as a polyfunctional material of a novel type which has not only light weight, good workability and electricl conductivity, but also ferromagnetic characteristics of Fe, and have now been put into practice as an electromagnetic shield material or a rotor material for induction motor. These materials are in a form where a function-imparting powder is uniformly dispersed in a matrix powder. Accordingly, this type of composite material cannot be applied to fields of parts, such as a rotor for spindle motors as shown in FIGS. 3 and 4, wherein portions 4, 5, 7 and 9 of a part are required to have different functions and are completely integrated into the part. Although the respective portions may be formed while taking ingredients and amounts of powders to be combined into account, a technique of integrating these portions in comformity with required strength has not been developed yet as stated before.

SUMMARY OF THE INVENTION

It is accordingly an object of the invention to provide a composite member which is inexpensively obtained by strongly integrating members constituted of materials of different compositions.

It is another object of the invention to provide a composite member made of at least two members of different materials wherein a resin material is used for bonding of the at least two members.

It is a further object of the invention to provide a method for fabricating a composite material of a uniform quality in mass production.

The above objects can be achieved, according to one embodiment of the invention, by a composite member which comprises at least two molding members made of different compositions each comprising a metallic powder and/or a ceramic powder and a resin material, the at least two molding members being integrated through bonding of the resin materials in the respective members. Preferably, the resin materials are made of a thermoplastic or thermosetting resin.

According to another embodiment of the invention, there is also provided a method for fabricating a composite member which is constituted of at least two members made of different starting powder compositions each comprising a metallic powder and/or a ceramic powder and a powder of a resin material and which is integrally bonded through the resin materials in the respective members, the method comprising providing at least one member which is a molding product of a desired form made of one starting powder composition, and placing and molding the at least one member and a starting powder composition for another member in molding dies, whereby the at least one member and another member are integrally formed through bonding of the resin materials in the respective members in the molding dies. The molding is effected while heating the molding dies to a temperature sufficient to metl the resin materials in the respective members. When cooled for thermoplastic resins or cured for thermosetting rsins, the members can be integrally bonded through the resin materials in the respective members.

PREFERRED EMBODIMENTS OF THE INVENTION

Figure 1:
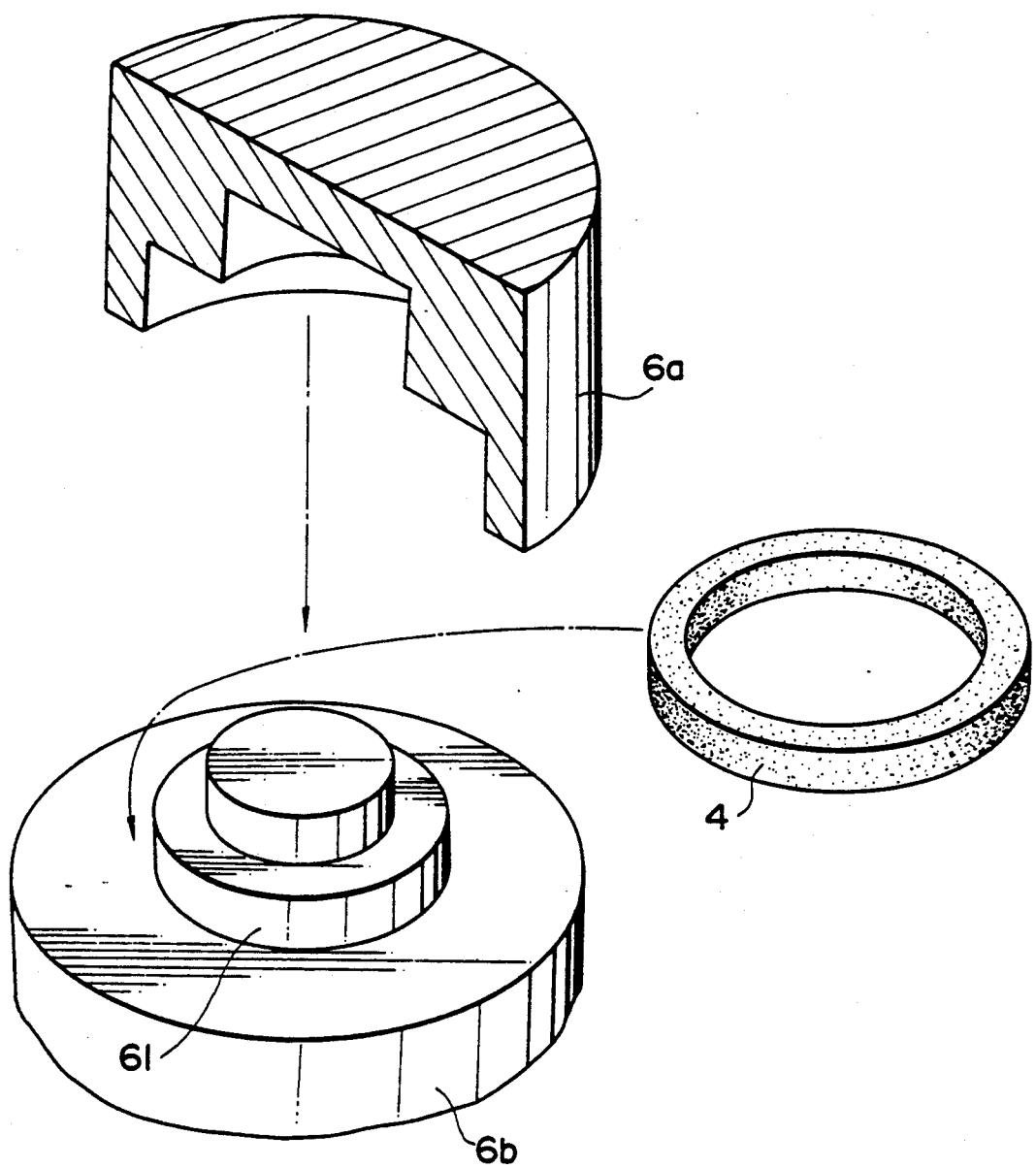
FIG. 1 is an illustrative view, partially in section, of a fabrication method according to the invention.
Figure 2:
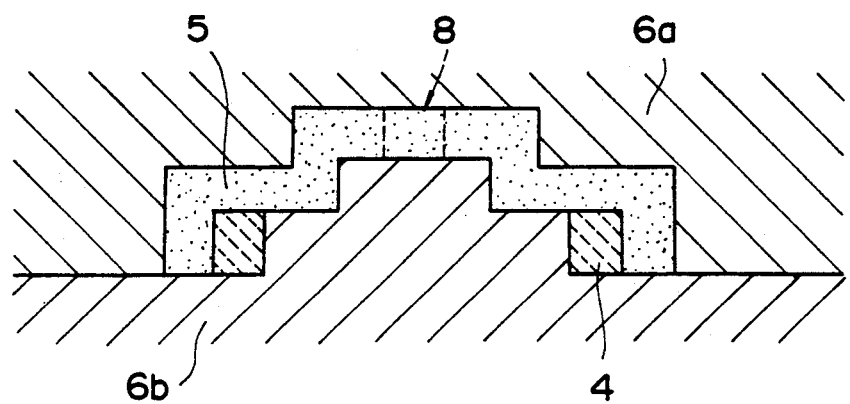
FIG. 2 is a sectional view showing a closed state of FIG. 1.
Figure 3:
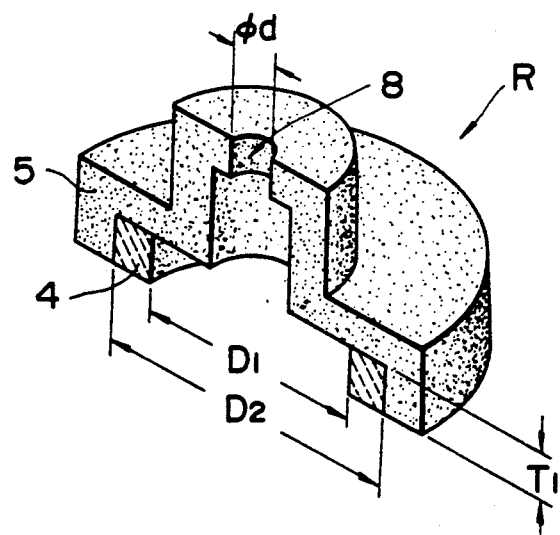
FIGS. 3 and 4 are, respectively, illustrative views, partially in section, of composite members fabricated in examples.

Reference is now made to the accompanying drawings and particularly to FIGS. 1 through 3.

FIG. 3 is a perspective view, partially in section, of a rotor R for spindle motors fabricated according to the method of the invention. The rotor R is constituted of an inverted pot-shaped aluminum powder-containing molding member 5 (hereinafter referred to simply as Al molding member 5) and a ring-shaped iron-containing molding member 4 (hereinafter referred to simply as Fe molding member 4). The Al molding member 5 forms a basal part of the rotor R and the Fe molding member 4 constitutes a magnetic material portion.

For the fabrication of the rotor R, an iron powder and a resin are first admixed to obtain an Fe powder mixture and placed and press molded in molding dies having a ring-shaped cavity to obtain the ring-shaped Fe molding member 4 particularly shown in FIG. 1. FIG. 1 is an illustrative perspective view of the molding dies for the rotor R. FIG. 2 is an illustrative, sectional view showing a closed state of the molding dies 6a, 6b shown in FIG. 1.

The Fe molding member 4 obtained by the press molding is palced at a projected portion 61 of a male die 6b and a starting powder obtained by mixing an aluminum powder and a resin powder is filled in a cavity established between the molding dies 6a, 6b. As is shown in FIG. 2, the male die 6b and the female die 6a are closed, after which the Al powder mixture is preseed to form an Al molding member. Simultaneously, the Fe molding member 4 and the Al molding member are integrated to form rotor R as shown in FIG. 3.

The resin powder used in the present invention includes, for example, powders of thermosetting resins such as epoxy resins, phenolic resins, unsaturated polyester resins and the like, and thermoplastic resins such as polyethylene, polypropylene, 6-nylon, 66-nylon, polyvinyl chloride, polyesters and the like. When these resin powders are used, the following heat treatment should preferably be performed.

For instance, when an epoxy resin powder is used for the formation of the Fe molding member 4 and the Al molding member 5, the molding dies 6a, 6b are heated to a temperature not lower than 150° C. As a result, the epoxy resin prior to curing is once melted to give a fluid. After melt bonding of both molding members 4, 5, the fluidized epoxy resin is cured. By the curing, the molding members 4, 5 are strongly bonded. Instead of directly heating the molding dies 6a, 6b, after the molding and integration of rotor R by means of the molding dies 6a, 6b, the molding product may be placed in a separate heating and curing furnace wherein the molding product or rotor is cured.

The rotor R fabricated by the above method is substantially free of the disadvantage that the molding members 4, 5 are separated from each other at the interface therebetween when undergoing an external force in cutting operation or when used in an environment where it repeatedly undergoes a temperature change up to approximately 170° C. at the maxiumum.

The thermal expansion coefficient of the resin material used in the rotor R has a value by several to several tens times greater than those of metal materials, so that the difference in thermal expansion between matrix materials such as iron and aluminum is negiligible in view of the degree of thermal expansion or thermal shrinkage of the binder or the resin material co-existing with the matrix material. Accordingly, the separation of the molding members 4, 5 as would be caused by the temperature change can be appropriately prevented.

The metallic powders used to form the molding members are not limited to an iron powder and an aluminum powder. For examples, there may be used hard magnetic powders such as of SmCo alloys, NdFe or NdFeB alloys and ferrites, and soft magnetic powders typical of which are ferrite-based stainless steel and Permalloy. In addition, inorganic powders such as ceramics including $Al_2O_3$, $SiO_2$ and the like may also be used.

The resin powder should preferably be used commonly in the respective memberts although different types of resin materials which are compatible with each other may be used for achieving the purposes of the invention.

The mixing ratio of the resin powder to the metallic powder in each member is not critical, but it is preferred that the ratio by volume is in the range of from 3 to 50%, preferably from 3 to 30%.

If the mixing ratio of the resin powder is less than 3% by volume, the bonding force of the resin material becomes weak with a reduced strength of the resulting molding member. This results in a poor endurance at the time of machining or poor durability when the member is used as a part for practical use. If these members are integrated into a composite member, the bonding strength between the molding members becomes low, and separation is liable to occur at the interface between the molding members. On the other hand, when the mixing ratio exceeds 50% by volume, the resin material is melted at the time of the curing by heating, whereupon the shape of the molding members is not retained. This leads to a poor dimensional accuracy of the molding members and the composite member, making it impossible to fabricate molding products with a uniform shape and a uniform size. In case where a thermoplastic resin is used as the resin material, the shape freezing property becomes so poor that the temperature control at the time of the molding has to be made more severely.

If iron powder and aluminium powder are used in combination as the metallic powders, the iron powder is preferably used in an amount of from 70 to 95% by volume and the aluminum powder is preferably used in an amount of from 50 to 90 by volume, by which the function as the metallic powder is shown without a lowering of the bonding force of a resin used. Likewise, when hard magnetic powder and soft magnetic powder are used in combination, the hard magnetic powder is preferably used in an amount of from 70 to 95% by volume and the soft magnetic powedr is preferably used in an amount of from 50 to 95% by volume.

The present invention is more particularly described by way of examples.

EXAMPLE 1

10% by volume of an epoxy resin powder was mixed with a flat iron powder and subjected to formation of a ring-shaped Fe molding member 4, as shown in FIG. 3, with an outer diameter, $D_1$, of 30 mm, an inner diameter, $D_2$, of 20 mm and a thickness, $T_1$, of 4 mm. Subsequently, the Fe molding member 4 was accommodated in molding dies 6a, 6b, in which an aluminum powder mixed with an epoxy resin powder at a mixing ratio of 20% by volume was filled and press molded. Thereafter, both members were integrated and cured by two-stage heating at 100° C. and 150° C., thereby obtaining rotor R as shown in FIG. 3.

The rotor R was made with a hole having a diameter of $d = 22$ mm$\phi$ at the central portion thereof and was used as a rotor for spindle motors for hard disk drive under heat cycling conditions of $-40 \rightleftarrows 125°$ C.

As a result, the rotor R used in this example involved little separation trouble of the constituent members when subjected to cutting and could be processed at high accuracy. Moreover, no separation between the Fe molding member 4 and the Al molding member 5 took place when repeatedly subjected to heat cycling over a long term.

EXAMPLE 2

Figure 4:
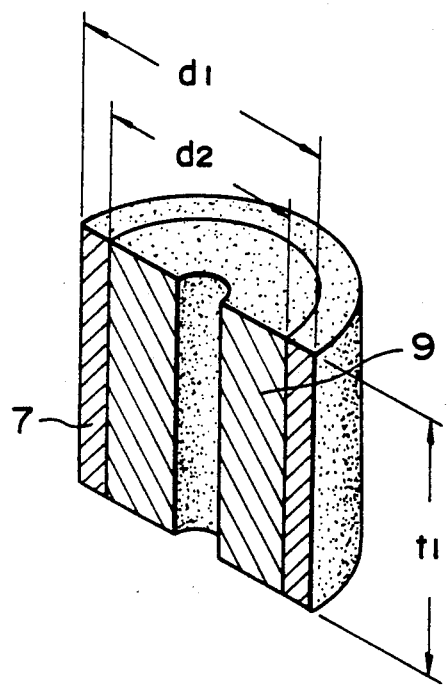
Figure 5:
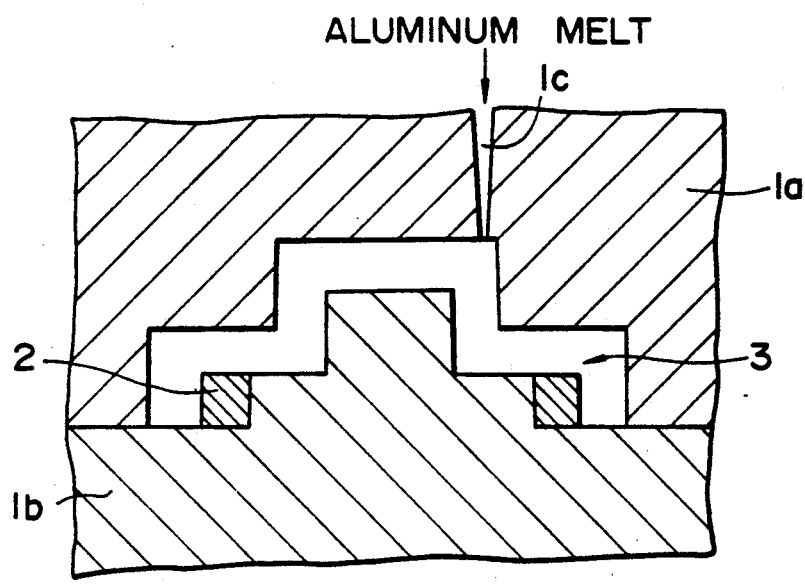
FIG. 5 is an illustrative view of rotor fabricated according to a prior art method.

A $Sm_2Co_{17}$ powder having an average size of 50 μm mixed with an epoxy resin powder at a mixing ratio of 10% by volume was molded in molding dies in the form of a cylinder as 7 in FIG. 4 (outer diameter $D_1 = 20$ mm, inner diameter $D_2 = 15$ mm, thickness $T_1 = 10$ mm). The resulting molding member 7 was accommodated in molding dies, and a flat iron powder 7 mixed with an epoxy resin powder at a mixing ratio of 15% by volume was filled in the cavity of the dies, followed by integrally press molding to obtain a composite member of the shape shown in FIG. 4. The composite member was cured at 170° C. and multipolarly magnetized in radial directions by the use of a magnetizer. Then, a shaft was forced into the central portion for use as a rotor for stepping motors.

As a result, it was found that no separation at the interface between the iron power-containing molding member 9 and the $Sm_2Co_{17}$ powder-containing molding member 7 took place at the time of the forcing operation and in use. Thus, the rotor could be used over a long term.

In Example 2, the rotor was also made by a press molding method while orienting the $Sm_2Co_{17}$ powder by means of a magnetic field orienting machine provided along radial directions of the molding dies. This rotor involved no problem such as separation between the molding members.

In the foregoing embodiments and examples, the method for fabricating a composite member which is used as a rotor for spindle motor or stepping motor. In this connection, however, final products to be fabricated may be not limited to the rotor but may be other electronic, electric or mechanical parts.

As will be apparent from the above, the composite member according to the invention is made of molding members which are strongly integrated with each other. The composite member can be efficiently mass-produced in uniform shape and uniform size.

What is claimed is:

1. A composite member comprising a plurality of molding members of different compositions, each molding member comprising a non-liquid resin material and a substantial amount of powder, wherein said powder is selected from the group consisting of metallic material and ceramic material, and wherein the molding members are integrated through bonding of the resin materials in the respective members and wherein said resin material is selected from the group consisting of epoxy resins, phenolic resins, unsaturated polyester resins, polyethylene, polypropylene, 6-nylon, 6,6-nylon, polyvinyl chloride and polyesters.

2. A composite member according to claim 1, wherein a first molding member comprises a metallic powder and a resin material, and a second molding member is made of a metallic powder different from that used in said first molding member and the same resin material as used in the first molding member.

3. A composite member according to claim 2, wherein said first metallic powder is an iron powder which is used in an amount of from 70 to 95% by volume of the total of the iron powder and the resin material and said second metallic powder is an aluminum powder which is used in an amount of from 50 to 90% by volume of the total of the aluminum powder and the resin material.

4. A composite member according to claim 2, wherein said first metallic powder is a hard magnetic powder which is used in an amount of from 70 to 95% by volume of the total of the hard magnetic powder and the resin material, and said second metallic powder is a soft magnetic powder which is used in an amount of from 50 to 95% by volume of the total of the soft magnetic powder and the resin material.

5. A composite member according to claim 1, wherein said resin material is used at a mixing ratio, to the metallic and/or the ceramic powder, of from 3 to 50% by volume.

6. A composite member according to claim 5, wherein the mixing ratio is from 3 to 30% by volume.

7. A composite member which comprises at least two molding members of different compositions, each comprising a non-liquid resin material and any one of a metallic powder or a ceramic powder or a mixture of a metallic and ceramic powders, the molding members being integrated through bonding of the resin material in the respective members, wherein said metallic powder is a material selected from the group consisting of iron powder, aluminum powder, SmCo alloy powders, NdFe alloy powders, NdFeB alloy powders, powdered ferrites, ferrite-based stainless steel powders and Perm-alloy powders, and wherein said resin material is selected from the group consisting of epoxy resins, phenolic resins, unsaturated polyester resins, polyethylene, polypropylene, 6-nylon, 6,6-nylon, polyvinyl chloride and polyesters.

8. A composite member which comprises at least two molding members of different compositions, each comprising a non-liquid resin material and any one of a metallic powder or a ceramic powder or a mixture of a metallic and ceramic powders, the molding members being integrated through bonding of the resin material in the respective members, wherein said ceramic powder is a material selected from the group consisting of $Al_2O_3$ and $SiO_2$, and wherein said resin material is selected from the group consisting of epoxy resins, phenolic resins, unsaturated polyester resins, polyethylene, polypropylene, 6-nylon, 6,6-nylon, polyvinyl chloride and polyesters.

* * * * *